US008817757B2

(12) United States Patent
Luo (10) Patent No.: US 8,817,757 B2
(45) Date of Patent: Aug. 26, 2014

(54) ZERO-CONFIGURATION SECURE MOBILITY NETWORKING TECHNIQUE WITH WEB-BASED AUTHENTICATION INTERFACE FOR LARGE WLAN NETWORKS

(75) Inventor: Hui Luo, Marlboro, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 296 days.

(21) Appl. No.: 10/298,485

(22) Filed: Nov. 18, 2002

(65) Prior Publication Data

US 2003/0169713 A1   Sep. 11, 2003

Related U.S. Application Data

(60) Provisional application No. 60/339,957, filed on Dec. 12, 2001.

(51) Int. Cl.
*H04W 4/00* (2009.01)
(52) U.S. Cl.
USPC ........................... 370/338; 370/310; 370/328
(58) Field of Classification Search
USPC .......................................... 370/310, 328, 338
See application file for complete search history.

(56) References Cited

U.S. PATENT DOCUMENTS

| | | | | |
|---|---|---|---|---|
| 6,584,314 B1 * | 6/2003 | Haumont et al. | ........... | 455/435.1 |
| 6,894,994 B1 * | 5/2005 | Grob et al. | ..................... | 370/335 |
| 6,925,442 B1 * | 8/2005 | Shapira et al. | ............... | 705/7.33 |
| 6,970,927 B1 * | 11/2005 | Stewart et al. | ................. | 709/225 |
| 7,082,114 B1 * | 7/2006 | Engwer et al. | ................. | 370/331 |
| 2002/0052965 A1 * | 5/2002 | Dowling | ....................... | 709/230 |
| 2002/0133534 A1 * | 9/2002 | Forslow | ......................... | 709/200 |
| 2003/0084287 A1 * | 5/2003 | Wang et al. | .................... | 713/168 |
| 2003/0191799 A1 * | 10/2003 | Araujo et al. | ................. | 709/203 |

* cited by examiner

*Primary Examiner* — Patrick Edouard
*Assistant Examiner* — Matthew Genack (57) ABSTRACT

A zero-configuration secure mobility networking technique for WLANs is provided, utilizing split link-layer and a Web-based authentication. The link-layer authentication process facilitates network-to-user authentication and generation of session-specific encryption keys for air traffic using digital certificates to prevent man-in-the-middle attacks without requiring users to have pre-configured accounts. Although any WLAN host can pass the link-layer authentication and obtain link connectivity, the WLAN only allows the host to obtain IP networking configuration parameters and to communicate with a Web-based authentication server prior to initiating the Web-based authentication process that is responsible for user-to-network authentication. The Web-based authentication server employs a Web page for initial authentication and a Java applet for consequent authentications. In the Web page, registered users can manually, or configure their Web browsers to automatically, submit their authentication credentials; new users can open accounts, make one-time payments, or refer the Web-based authentication server to other authentication servers where they have accounts. Once a user is authenticated to the WLAN, the user's mobile host obtains full IP connectivity and receives secure mobility support from the WLAN. The mobile host always owns a fixed IP address as it moves from one access point to another in the WLAN. All wireless traffic between the mobile host and the WLAN is encrypted. Whenever the mobile host moves to a new access point, a Java applet (or an equivalent client-side program delivered over Web) enables automatic authentication of the mobile host to the WLAN. In addition, the ZCMN method supports dynamic load balancing between home agents. Thus, a mobile host can change home agents during active sessions.

15 Claims, 2 Drawing Sheets

ZERO-CONFIGURATION SECURE MOBILITY NETWORKING TECHNIQUE WITH WEB-BASED AUTHENTICATION INTERFACE FOR LARGE WLAN NETWORKS

CROSS REFERENCE TO RELATED APPLICATIONS

This application claims priority to Provisional Application Serial No. 60/339,957 entitled "A ZERO-CONFIGURATION SECURE MOBILITY NETWORKING TECHNIQUE WITH WEB-BASE AUTHENTICATION METHOD FOR LARGE WLAN NETWORKS" filed on Dec. 12, 2001, the content of which is incorporated by reference herein.

FIELD OF THE INVENTION

The present invention relates generally to mobile networking, and more particularly, to a method for providing secure networking for mobile hosts using fixed IP addresses.

BACKGROUND

There are three primary mobility protocols for data networks: Mobile IP, Cellular Digital Packet Data (CDPD), and Inter-Access Point Protocol (IAPP). Mobile IP was proposed to support mobile computers on the Internet without considering link-layer handoff details, CDPD has been deployed to support IP-based mobile computers connected to cellular networks, and IAPP is used to support WLAN stations roaming between access points in a Distribution System. Mobile IP and CDPD are designed to provide mobility for large-area data networks. Sometimes they are referred as "macro mobility solutions." Although IAPP can be operated at the IP layer over the Internet, the common practice is to operate IAPP for mobility support within a subnet, because most routers do not exchange multicast IP packets between subnets.

In Mobile IP, a "home agent" is deployed on the Internet to track the location of mobile computers (hereinafter referred to as "mobile hosts" or "WLAN hosts") and to route IP packets to the mobile hosts irrespective of their physical locations. A mobile host owns a fixed IP address that belongs to the subnet (i.e., a group of continuous IP addresses with some boundary conditions) of the home agent. Any application programs running on the mobile host use this fixed IP address as the source IP address during network communications. Whenever the mobile host attaches to a subnet, a care-of IP address belonging to the subnet is reported to the home agent, so that the home agent can route inbound IP packets to the mobile host's current location using an IP tunnel. If a foreign agent is deployed on the subnet, the foreign agent's IP address is the mobile's care-of IP address. If there is no foreign agent, the mobile host must have a built-in foreign agent, and it needs to apply an IP address from the subnet for this built-in foreign agent.

All IP packets destined for the mobile host are intercepted by the home agent when they arrive at the home agent's subnet. The home agent encapsulates these packets into new IP packets with the home agent's IP address as source IP address and the care-of IP address as destination IP address. When they arrive at the foreign agent, the encapsulated packets are decapsulated, and the inner IP packets are delivered to the TCP/IP stack of the operating system of the mobile host. IP packets that are communicated from the mobile host to a destination host are encapsulated into new IP packets by the foreign agent. The outer source IP address is the care-of IP address, and the outer destination IP address is the home agent's IP address. CDPD operates similar to Mobile IP, with the foreign agent function built into cellular networks. IAPP is primarily designed as an intra-subnet mobility protocol. IAPP signaling provides for two types of messages: announcement messages and forwarding messages. Whenever a WLAN station associates with an access point, the WLAN station or the access point must multicast the arrival event to other access points belonging to the same Distribution System. This multicast message serves two purposes. First, it educates all link-layer routing instruments in the subnet, such as an Ethernet switch, and causes them to update their internal routing table for routing efficiency. Second, it enforces single association at any given time, in accordance with the IEEE 802.11 standard. The announcement message informs the access point that was previously associated with the WLAN station to forward the frames to the access point that is currently associated with the WLAN station. The multicast mechanism confines the IAPP within a subnet because most of routers do not support multicast crossing the subnet boundaries. In addition, IAPP suffers scalability problems as the number of WLAN stations becomes very large.

WLANs have become increasingly popular since the release of the IEEE 802.11b standard. An 802.11b WLAN access point can support an aggregated transmission rate of up to 11 Mbps and cover a distance of up to 100-300 feet. Since WLAN was designed as wireless extension of the Ethernet for indoor use, it has adopted a simple protocol known as WEP for authentication and encryption. According to WEP, every WLAN station and every access point in a Service Set share a common, static key, called a WEP key. It has either 40 bits (standard) or 128 bits (non-standard). The authentication process is either an open authentication (based on which some advanced authentication method, such as an 802.1x/EAP method, can be built) or a challenge and response authentication based on the WEP key. The encryption algorithm is RC4 with the key sequence generated by the WEP key and a random vector. However, the security flaws of WEP have been highly publicized, which are mainly due to the implementation flaw of the key scheduling algorithm in the RC4 algorithm and the use of a static WEP key shared by everybody.

To address the security flaws associated with WEP, the IEEE 802.1x standard has been introduced and the IEEE 802.11i standard is currently under development. Using the IEEE 802.1x standard along with various EAP (Extensible Authentication Protocol) protocols, WLAN authentication can be managed from a centralized server such as a RADIUS server, using session-specific keys for encryption purposes. Security flaws in the RC4 algorithm implemented in WEP can be fixed to a certain extent if the session-specific key can be changed frequently. According to the IEEE 802.11i standard draft, the AES algorithm will become the ultimate encryption algorithm to protect the over-the-air traffic.

Networking configuration can be a troublesome task for ordinary computer users, especially for those who desire broadband Internet access in public places such as convention centers and hotels. Configuring a computer to communicate with a WLAN is even more complicated. In addition to ordinary configuration jobs such as setting up DHCP, WLAN configuration includes specifying an SSID (Service Set Identifier) and enabling/disabling WEP keys. If IEEE 802.lx is adopted, the configuration task further involves the provisioning of computer accounts at some centralized authentication server, which is extremely inconvenient for users who want to use the WLAN access service anywhere.

In order to address these problems, "zero-configuration" techniques have been developed. Zero-configuration mobility networking (ZCMN) enables Internet Protocol (IP) mobility networking for a mobile host, without the need for the host to be configured with built-in mobility support functions, which typically requires the installation of specialized mobility software and/or hardware. With ZCMN, mobile hosts have fixed IP addresses and are unaware of their mobility. The network tracks the mobile hosts through the fixed IP addresses and routes IP packets to these fixed addresses regardless of a host's physical location. Zero-configuration is accomplished by configuring all WLAN hosts into the most popular mode. In other words, the mobile host uses DHCP to get IP addresses and other IP networking parameters from the network. The SSID is a "default". The WEP key is disabled and access points admit any WLAN hosts. Authentication is implemented through a Web-based expedient and the access control is implemented at the network layer. Thus, a mobile host obtains an IP address and receives very limited IP routing service from the WLAN such that it can only contact a Web server to obtain a Web page for user authentication purposes. After the user is successfully authenticated to the Web server, limitations on the mobile host's IP address are eliminated, and the mobile host is free to obtain regular Internet access. This method has been adopted by a number of WLAN service providers such as Boingo and GRIC.

The foregoing ZCMN methods pose security concerns for both users WLAN operators. Since the WEP key is disabled and IEEE 802.1x has not been widely adopted, the WLAN is open at the link layer and air traffic is not encrypted. In addition, because after the user is authenticated to the Web server, access control is based solely on the MAC address and IP address of the mobile host, it is relatively easy to steal WLAN service.

ZCMN provides many advantages over common mobility protocols such as Mobile IP, which requires modifications to the TCP/IP stack of the operating system to enable the mobile host to communicate with home and/or foreign agents on the network. Because of the proprietary nature of some operating systems such as Windows®, Mobile IP is impractical. The potential market for large WLAN networks is very promising, and the network side is ready to support mobility. However, there is currently no widely accepted mobility solution on the client side. As the popularity of portable wireless computers and consumer electronic devices capable of supporting networking functions increases, it is desirable to provide a technique that eliminates the need for client-side mobility functions so as to avoid complications for the average user who may not be computer savvy.

ZCMN requires appropriate security solutions for use in the WLAN environment. Current ZCNM for WLANs include IAPP, PacketAir's mobility router, and ReefEdge's Mobile Domain techniques. These rely upon client-side software offered by WLAN card vendors or operating systems to address security on the WLAN at the link layer. In this regard, the authentication process is based on the new IEEE standard 802.1x and the encryption process is currently based on improved WEP (Wired Equivalency Privacy) with frequent key updates. The WEP approach to authentication, which relies on a commonly shared static key, is unacceptable for use in large-scale WLAN networks that need to support a great number of users. Furthermore, there are security flaws in the original WEP. The encryption algorithm will likely be changed to the Advanced Encryption Standard AES after the IEEE 802.11i standardization process is finished.

Unfortunately, user convenience with the above ZCMN techniques is limited by current 802.1x-based WLAN authentication protocols. For example, Lightweight Extensible Authentication Protocol (LEAP), a popular 802.1 x-based method, requires that every user have an associated account at a centralized authentication server, such as a Remote Authentication Dial In User Service (RADIUS) server. This makes it essentially impossible to have a completely zero-configuration solution because user-specific account information for each user must be pre-configured in the mobile host. In addition, because it is impossible for a user to open an account by connecting to the WLAN that only admits connections from users already having an account, the user must create an account using an out-of-band method, even though he or she is within the coverage of the WLAN.

SUMMARY OF THE INVENTION

A zero-configuration secure mobility networking technique for WLANs is provided, utilizing split link-layer and a Web-based authentication. The link-layer authentication process facilitates network-to-user authentication and generation of session-specific encryption keys for air traffic using digital certificates to prevent man-in-the-middle attacks without requiring users to have pre-configured accounts. Although any WLAN host can pass the link-layer authentication and obtain link connectivity, the WLAN only allows the host to obtain IP networking configuration parameters and to communicate with a Web-based authentication server prior to initiating the Web-based authentication process that is responsible for user-to-network authentication. The Web-based authentication server employs a Web page for initial authentication and a Java applet for consequent authentications. In the Web page, registered users can manually, or configure their Web browsers to automatically, submit their authentication credentials; new users can open accounts, make one-time payments, or refer the Web-based authentication server to other authentication servers where they have accounts. Once a user is authenticated to the WLAN, the user's mobile host obtains full IP connectivity and receives secure mobility support from the WLAN. The mobile host always owns a fixed IP address as it moves from one access point to another in the WLAN. All wireless traffic between the mobile host and the WLAN is encrypted. Whenever the mobile host moves to a new access point, a Java applet (or an equivalent client-side program delivered over Web) enables automatic authentication of the mobile host to the WLAN. In addition, the ZCMN method supports dynamic load balancing between home agents. Thus, a mobile host can change home agents during active sessions.

The present invention will now be described in detail with particular reference to the accompanying drawings.

DETAILED DESCRIPTION OF THE PREFERRED EMBODIMENTS

In accordance with the present invention, there is provided a zero-configuration secure mobility networking (ZCMN) technique for a WLAN network (i.e., a network consisting of many WLANs), which generally comprises a zero-configuration WLAN security method and a zero-configuration mobility method. The zero-configuration WLAN security method utilizes a WLAN authentication process that is split into a link-layer authentication process and a Web-based authentication process. The link-layer authentication process is based on EAP-TLS (Transport Layer Security) or EAP-TTLS-PAP (Tunneled Transport Layer Security—Password Authentication Protocol), an 802.1x-based authentication method using digital certificates. If EAP-TLS is used, the EAP-TLS authentication server is configured so as not to enforce user-to-network authentication, thus no distinctive account information needs to be pre-configured on mobile computers. If EAP-TTLS-PAP is used, the authentication server admits any username and password. In short, the link-layer authentication process is responsible for network-to-user authentication and generating session-specific encryption keys. Although any WLAN host can pass the link-layer authentication and obtain link connectivity, the WLAN only allows it to obtain IP networking configuration parameters and to communicate with a Web-based authentication server before it passes the Web-based authentication process that is responsible for user-to-network authentication. The Web-based authentication server employs a Web page for initial authentication and a Java applet (or an equivalent client-side program delivered by the Web page and installed by the user. Hereafter it is assumed to be a Java Applet for the sake of simplicity, although a binary code is preferred) for consequent authentications. In the Web page, registered users can manually, or configure their Web browsers to automatically, submit their authentication credentials; new users can open accounts, make one-time payments, or refer to the Web-based authentication server to other authentication servers where they have accounts. Once a user is authenticated to the WLAN, his mobile host obtains full IP connectivity and receives secure mobility support from the WLAN. That is, the mobile host always owns a fixed IP address as it moves from one access point to another in the WLAN, and the air traffic between the mobile host and the WLAN is encrypted. Whenever the mobile host moves to a new access point, the Java applet is responsible to authenticate the mobile host to the WLAN automatically.

Figure 1:
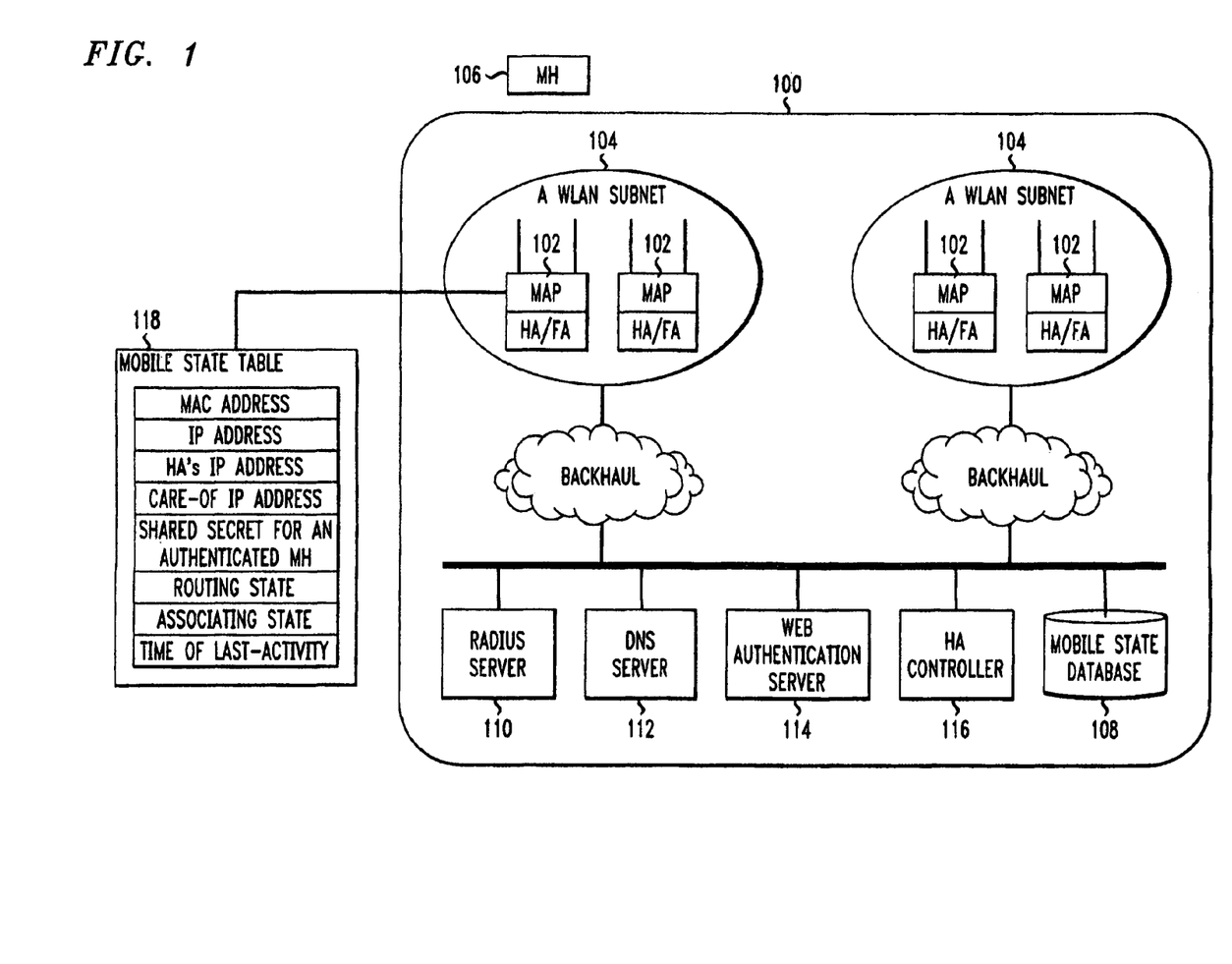
FIG. 1 is a schematic of a network of WLANs.

Referring to FIG. 1, there is depicted a schematic diagram illustrating a network of WLANs 100. In accordance with the present invention, mobility access points (MAPs) 102 are deployed on every subnet 104 in a large-scale network of WLANs. A MAP can be a piece of stand-alone equipment deployed behind a regular WLAN access point or a group of WLAN access points, or it can be built as an enhanced WLAN access point. In FIG. 1, the MAPs are illustrated as being built in WLAN access points. These MAPs 102 serve as home and foreign agents for mobile hosts. Every mobile host 106 is automatically assigned a MAP 102 as its home agent, which is located at the subnet 104 where the mobile host receives its IP address. The mobile host's MAC address, IP address, and home agent's IP address are stored in a centralized database 108 in the WLAN network 100. When the mobile host 106 moves into another subnet 104, a MAP 102 in the new subnet serves as the mobile's foreign agent. It discovers the mobile's home agent 102 by querying the database 108 using the mobile host's MAC address, and establishes an IP tunnel with the home agent 102 to route IP packets for the mobile host 106. The routing mechanism between the mobile host 106 and the MAP 102 utilizes the MAC addresses for the mobile host 106 and MAP 102. The intra-subnet mobility is supported using IAPP. In addition, dynamic load balancing is implemented between home agents 102. A mobile host can change its home agent to another MAP 102 in the same subnet during active sessions.

A large-scale WLAN network 100 that supports the ZCMN technique comprises a RADIUS server 110 that supports EAP-TLS, a conditional DNS (Domain Name Service) server 112, a Web-based authentication server 114, a home agent controller 116, the centralized mobile state database 108, and a plurality of MAPs 102 that connect a large number of access points, which are distributed into multiple subnets 104. The above components are identified based on their functionalities. Some of these may be physically implemented on a single computer.

MAPs 102 are responsible for implementing access control for WLANs, and for providing mobility support for mobile hosts. They can either be implemented as an enhanced access point or as a stand-alone Ethernet bridge that connects access points with the wired network. For the purpose of illustration, it is assumed that the functionalities of MAPs are implemented in access points.

Every access point maintains a mobile state table 118 for the mobile hosts that are associating with it or had previously associated with it within a specified time interval. An exemplary data structure of a state record for a ---
Mobile host's MAC address
Mobile host's IP address
Home agent's IP address
Mobile host's care-of IP address
Shared secret between the mobile host and the WLAN
Routing state
Associating state
Time of last activity
---

The mobile host's routing state is set to "normal," "limited," or "blocked." The "normal" state means that the mobile host has been authenticated to the WLAN through the Web interface. In such a case, the access point will relay all frames that are communicated to and from the mobile host. A "limited" state means that the mobile host has not been configured or has not been authenticated yet. In this state, the access point should block all frames except those carrying IP configuration packets (such as DHCP and ARP (Address Resolution Protocol)) between the mobile host and the WLAN, DNS packets between the mobile host and the conditional DNS server, and HTTP packets between the mobile host and the Web-based authentication server. A "blocked" state means that the mobile host is considered to be hostile to the WLAN due to various reasons, such as repeated authentication failures or suspicious activities. In that state, the access point will block all frames sent to and from the mobile host.

A mobile host's associating state is either "associated" or "unassociated". When a mobile's associating state is "unassociated", the access point may still know the mobile's care-of IP address if the access point is the mobile's home agent. If the mobile host's care-of IP address is 0.0.0.0, it means that the access point is not the mobile host's home agent. If the mobile's care-of IP address is 255.255.255.255, it means the access point is the mobile host's home agent, but that it does not know where the mobile host is located.

A mobile host's state record in state table 118 is downloaded from the centralized mobile state database 108 when the mobile host associates with the access point. It is removed from the mobile state table 118 if the time-of-last-activity exceeds a specified time period.

The centralized mobile state database 108 maintains state records for every mobile host that is in the WLAN 100 or was in the WLAN 100 a short time ago. Every access point queries the database 108 when a mobile host 106 associates with it.

The conditional DNS server 112 queries the database 108 to determine whether it should reply to an IP address resolution request with the Web-based authentication server's IP address. The home agent controller 116 updates the database 108 whenever it changes the home agent for a mobile host. The Web-based authentication server 114 updates the database 108 depending the results of the user authentication process.

The RADIUS 110 server is responsible for network-to-user authentication and for generating session-specific keys to encrypt air traffic. It does not to enforce user-to-network authentication. Instead, the user-to-network authentication is handled by the Web authentication server. The conditional DNS server 112 provides answers to IP address queries from mobile hosts that depending upon the routing state. If a mobile host's routing state is "blocked", the DNS server 112 does not respond. If a mobile host's routing state is "limited", the DNS server 112 always responds to the mobile host with the Web-based authentication server's IP address. If a mobile host's routing state is "normal", the DNS server 112 responds in an ordinary fashion.

The Web-based authentication server 114 is responsible for user-to-network authentication. It supplies a Web page to a mobile host in the "limited" state to facilitate initial authentication. After a user is authenticated to the WLAN through the Web interface, the Web authentication server 114 generates a Java applet and sends it back to the mobile host as an authentication response. The Java applet contains a large nonce that is stored in the mobile host's state record 118. When the mobile host 106 associates with another access point, that access point can authenticate the user automatically by challenging the Java applet based on the nonce.

The home agent controller 116 is responsible for monitoring and/or adjusting the traffic load on every home agent. Signaling protocols are running between access points 102, the Web-based authentication server 114, the centralized database 108, and the home agent controller 116. They are all carried using UDP packets. The mobile state transfer protocol is used for an access point to download the state record from the centralized database 108 for a mobile host 106 that arrives at the access point 102. The protocol comprises a MOBILE STATE REQUEST message (from the access point to the database) and a MOBILE STATE RESPONSE message (from the database to the access point). The mobile host's MAC address is included in the MOBILE STATE REQUEST message as an index. The mobile host's state record is included in the MOBILE STATE RESPONSE message.

A home agent notification protocol is used by the home agent controller 116 to signal an access point 102 that it has been designated as the home agent for a mobile host 106. The protocol consists of two messages, the HOME AGENT NOTIFICATION message (from the home agent controller to the access point) and the HOME AGENT ACKNOWLEDGE message (from the access point to the home agent controller). A mobile host's state record 118 and a decision are included in the HOME AGENT NOTIFICATION message. The HOME AGENT ACKNOWLEDGE message does not contain any information, but rather serves an acknowledgement purpose.

A care-of address registration protocol is used for an access point 102 that is the mobile host's foreign agent to signal another access point that is the mobile host's home agent. The protocol consists of a CARE-OF ADDRESS REGISTRATION message (from the access point that is the mobile host's foreign agent to the access point that is the mobile host's home agent) and the CARE-OF ADDRESS ACKNOWLEDGE message (from the access point that is the home agent to the access point that is the mobile host's foreign agent). The IP address of the access point that acts as the foreign agent is included in the CARE-OF ADDRESS REGISTRATION message. The CARE-OF ADDRESS ACKNOWLEDGE message does not contain any information. It only serves the acknowledgement purpose.

A load report protocol is utilized by an access point 102 to report its load to the home agent controller 116 periodically, such that the home agent controller 116 can balance the load by making the access point the home agent for a smaller number of mobile hosts using the home agent notification protocol. The load report protocol comprises a single LOAD REPORT message (from access points to the home agent controller).

An automatic authentication protocol is used to download a Java applet from the Web interface, to automatically authenticate the mobile host to a new access point after the mobile host associates with it. The protocol comprises an AUTHENTICATION CHALLENGE message (from the access point to the mobile host) and an AUTHENTICATION RESPONSE message (from the mobile host to the access point). A nonce generated by the access point is included in the AUTHENTICATION CHALLENGE message. The computed response is included in the AUTHENTICATION RESPONSE message.

Figure 2:
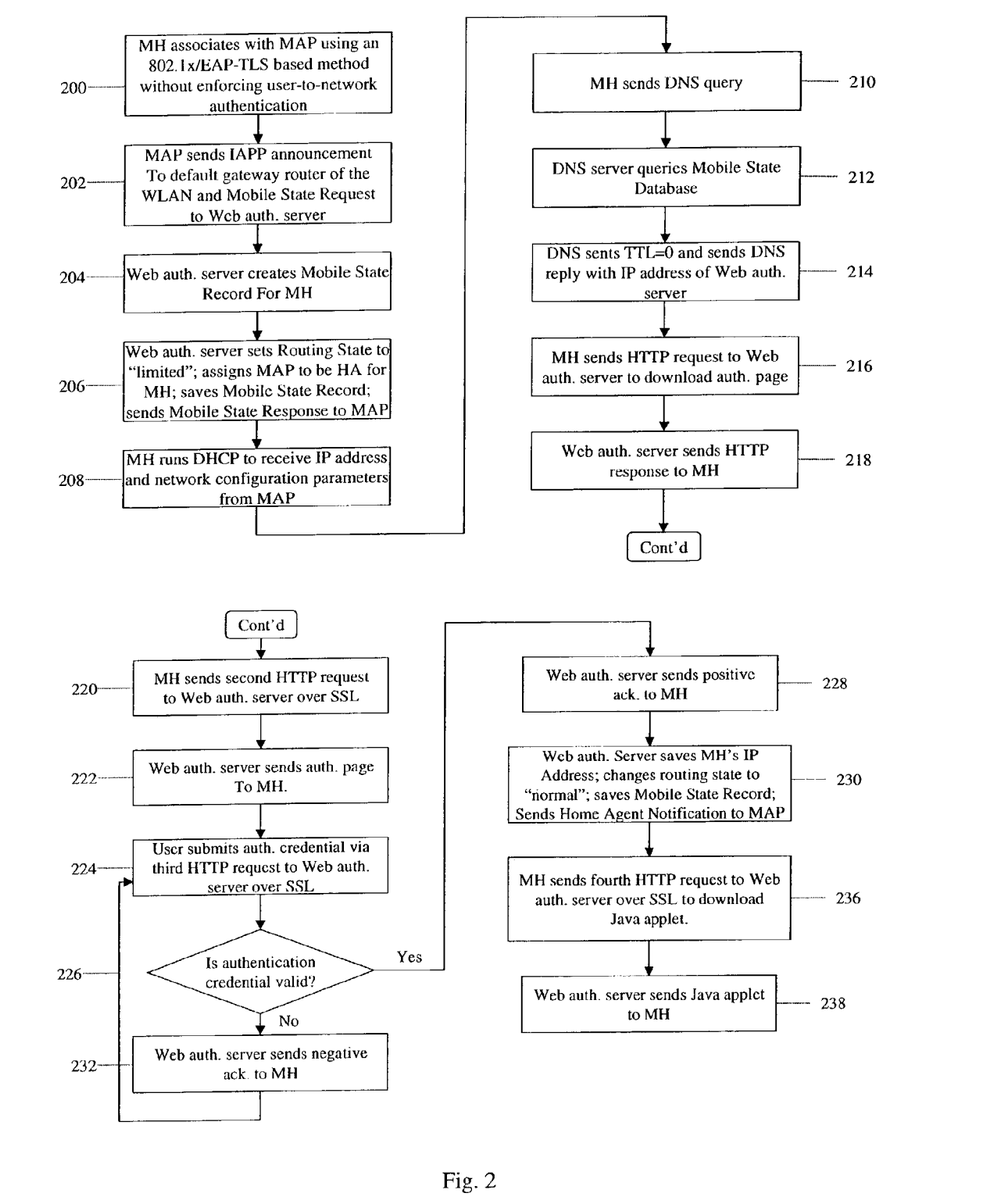
FIG. 2 is a flow diagram of procedure for a mobile user to connect to a WLAN with mobility support using a Web interface for authentication.

With reference now to FIG. 2 of the drawings, there is depicted a high-level schematic of a procedure whereby a user connects to a WLAN with mobility support using a Web interface for authentication.

Initially, the user turns on his mobile host with a WLAN card installed (not shown). The WLAN card should automatically associate with an MAP using an 802.1x/EAP-TLS based method if under the coverage of a WLAN, because it is assumed that the EAP-TLS protocol does not enforce user-to-network authentication. The mobile host associates with the MAP at 200. At 202 the MAP sends an IAPP announcement message to the default gateway router of the WLAN and then sends a MOBILE STATE REQUEST message to the Web authentication server using the mobile host's MAC address as the index. At this time, the Web authentication server does not yet have a state record for the mobile host, so at 204 it creates a new state record for the mobile host. At 206, the Web authentication server inserts the mobile host's MAC address, sets the routing state to be "limited," assigns the MAP as the mobile's home agent, saves the state record in its database, and sends the state record back to the MAP in an MOBILE STATE RESPONSE message. The MAP knows that it is now the mobile host's home agent from the returned state record.

The mobile host then runs DHCP to obtain an fP address and other network configuration parameters from the MAP at 208.

The user then launches his Web browser. Assuming the user specifies a non-blank home page that is pointed to by a regular URL (not by the dotted IP address) such as "http://www.att.com", the Web browser first sends a DNS query message at 210 to resolve the IP address of the Web server that supplies this home page.

After receiving the DNS query message, at 212 the DNS server in the WLAN queries the centralized mobile state database and finds that the mobile host is currently in a "limited" state. At 214, the DNS server replies with the IP address of the Web authentication server in the WLAN. The TTL (Time-To-Live) field of this DNS reply message is set to be zero, which prevents the mobile host from caching this DNS query result (i.e., this is a fake answer).

After receiving the DNS reply message, at 216 the user's Web browser sends an HTTP request message to download the home page, which is actually sent to the Web authentication server.

In response, at 218 the Web authentication server replies with a short HTTP response message that contains a redirect URL pointing to the SSL (Secure Socket Layer) port of itself.

After receiving the redirect HTTP response message, at 220 the Web browser sends a second HTTP request message over the SSL to the Web authentication server to download the authentication page.

After receiving the second HTTP request message over the SSL, at 222 the Web authentication server sends back the authentication page in an HTTP response message over the SSL. The authentication page can support various user authentication methods.

After receiving the HTTP response message over SSL, at 224 the Web browser renders the authentication page for the user. The user clicks a "Done" button to submit authentication credentials to the Web authentication server via a third HTTP request message over the SSL.

After receiving the third HTTP request message over SSL, the Web authentication server checks the validity of the submitted authentication credentials at 226. If they are valid, the Web authentication server generates a positive acknowledge page at 228 and sends it back in an HTTP response message over the SSL. At the same time, at 230 the Web authentication server saves the mobile host's IP address, changes the mobile host's routing state to be "normal", saves the completed state record in its database, and sends a HOME AGENT NOTIFICATION message to notify the MAP that the routing state for the mobile host has been changed from "limited" to "normal". If the submitted authentication credentials are invalid, the Web authentication server generates a negative acknowledge page and at 232 sends the same to the mobile host in an HTTP response message over the SSL. The user can then resubmit the authentication credentials.

The positive acknowledge page contains a JavaScript instruction that can pop up a small browser window when it is rendered by the Web browser on the mobile host. At 236 the small browser window will automatically send the fourth HTTP request message over SSL to the Web authentication server to download a Java applet. After the Java applet is downloaded at 238, it grants some networking privileges so that it can listen to a specific UDP port for AUTHENTICATION CHALLENGE messages. The Java applet shares a high-entropy secret with the Web authentication server, which can then be used to generate AUTHENTICATION RESPONSE messages.

The mobile host can now use the assigned IP address during the entire session as long as it is under the coverage of the WLAN. The user should keep the small browser window always open. The Java applet runs in this small browser window and authenticates the user to the WLAN as the user moves from one MAP to another.

Every MAP needs to process four link-layer events: the association of a mobile host, the de-association of a mobile host, the arrival of an inbound frame sent to a mobile host or the MAP itself, and the arrival of an outbound frame sent from a mobile host. When a mobile host successfully associates with an MAP, which means the mobile host goes through the EAP-TLS protocol conversation, the MAP resolves the mobile host's IP address to authenticate the mobile host and to notify the mobile host's home agent if the MAP itself does not function as the mobile host's home agent. An exemplary process is depicted below using C syntax.

```
BEGIN
{
  The MAP looks up its state table using the mobile host's MAC address as
  the index.
  If (There is no state record for this MAC address OR the routing state is
  not "blocked")
  {
    // If the routing state is blocked, the mobile host is ignored. (The
    "blocked" routing state verification is placed in the first step is for
    the resistance of denial-of-service attack. However, the time-of-last-
    activity is not updated because legal users who repeatedly fail
    authentication should be given a second chance after waiting for some
    time (so that this state record will be removed due to expiration)).
    The MAP sends a MOBILE STATE REQUEST message to the
    database to request the state record for the mobile host using the
    MAC address as the index. If (The database does not respond within
    a short time)
    {
      If (There is no state record for this MAC address in the MAP's state
      table)
      {
        The MAP creates an empty state record for this MAC address.
      }
    }
    else // The database sends back the mobile's state record.
    {
      The MAP saves the received state record into its state table.
    }
    The MAP sets the associating state to be "associated".
    The MAP updates the time-of-last-activity using the current time.
    If (The routing state in the mobile's state record is "normal")
    {
      The MAP sends an AUTHENTICATION CHALLENGE message
      to a UDP port of the mobile host, to which a Java applet is listening
      if the mobile host has been authenticated using a Web interface.
      If (The mobile host does not respond OR the mobile's response
      is wrong)
      {
        The MAP sets the routing state to be "blocked".
        The MAP updates the time-of-last-activity using the current time.
      }
      else // The mobile host responds correctly
      {
        If (The MAP is not the mobile's home agent)
        {
          The MAP sends a CARE-OF ADDRESS REGISTRATION
          message to the mobile's home agent using the IP routing method.
        }
        If (The MAP is in the same subnet as the mobile's home agent)
        {
          The MAP sends an IAPP announcement message to the wired
          network.
        }
        The MAP updates the time-of-last-activity using the current time.
      }
    }
    else // The routing state in the mobile host's state record is "limited"
    {
      If (The MAP is not the mobile host's home agent)
      {
        The MAP sends a CARE-OF ADDRESS REGISTRATION message
        to the mobile host's home agent using the IP routing method.
      }
      If (The MAP is in the same subnet as the mobile host's home agent)
      {
        The MAP sends an IAPP announcement message to the wired
        network.
      }
      The MAP updates the time-of-last-activity using the current time.
    }
  }
}
END
```

When a mobile host de-associates with an MAP, the MAP sets the associating state to be "unassociated" in the mobile host's state record and updates the time-of-last-activity using the current time.

When an inbound frame arrives at an MAP, the MAP must identify the type of arriving frames, and to relay, re-route or digest it accordingly. There are two kinds of inbound frames: frames sent to a mobile host, and frames sent to the MAP.

For a frame sent to a mobile host, there are two scenarios. In the first, if the mobile host is associating with the MAP, the frame is simply relayed to the mobile host. In the second, if the mobile host is not associating with the MAP, if the MAP is the mobile's home agent, and if the mobile host is associating with an MAP on another subnet, the MAP encapsulates the frame into an IP packet and sends it to the mobile's care-of IP address using an IP routing method.

For a frame sent to the MAP itself, there are five scenarios. First, if the IP packet carried by the inbound frame encapsulates an Ethernet frame and if the Ethernet frame's source MAC address is the MAC address of a mobile host of which the home agent is the MAP, the Ethernet frame is sent back to the wired network. In this case, the MAP acts as a home agent. Secondly, if the IP packet carried by the inbound frame encapsulates an Ethernet frame and if the Ethernet frame's destination MAC address is a mobile's MAC address, we have two cases. In the first case, if the mobile host is associating with the MAP, the Ethernet frame is relayed to the mobile host. In the second case, if the mobile host is not associating with the MAP but was associating with the MAP a short time ago, the MAP replaces the Ethernet frame's source MAC address by its own MAC address and sends it to the WLAN, in hope of the mobile host still being on the same subnet. In this scenario, the MAP acts as a foreign agent. Third, if the IP packet carried by the inbound frame carries a MOBILE STATE RESPONSE message, the MAP needs to update the mobile host's state record accordingly. Fourth, if the IP packet carried by the inbound frame carries a HOME AGENT NOTIFICATION message from the home agent controller, the MAP needs to update the state record for the mobile host, to announce the arrival of the mobile host using IAPP if the mobile host is not associating with another MAP on the same subnet, and to send back a HOME AGENT ACKNOWLEDGE message to the home agent controller. Finally, if the IP packet carried by the inbound frame carries a CARE-OF ADDRESS REGISTRATION message from another MAP, the MAP needs to update the state record for the mobile host and to send back a CARE-OF ADDRESS ACKNOWLEDGE message to the first MAP. An illustrative process is depicted below using C syntax.

```
BEGIN
{
 If (The frame's destination MAC address is not the MAP's MAC
   address)
 {
  // This frame is sent to the mobile host.
  The MAP looks up its state table using the frame's destination MAC
  address as the index.
  If (There is no state record for this MAC address)
  {
   The frame is dropped.
  }
  else // There is a state record for this MAC address
  {
   If (The routing state is "blocked")
   {
    The frame is dropped.
   }
   else if (The routing state is "limited")
   {
    If (The associating state is "associated")
    {
```

```
     If (The carrying packet is not an TIP configuration packet AND
       The carrying packet is not a DNS reply packet AND
       The carrying packet is not an HTTP packet from Web
       authentication server)
     {
      The frame is dropped.
     }
     else // The frame is entitled to pass the MAP.
     {
      The frame is relayed to the mobile host.
      The MAP updates the time-of-last-activity using the current time.
     }
    }
    else // The associating state is "unassociated"
    {
     The frame is dropped.
    }
   }
   else // The routing state is "normal"
   {
    If (The associating state is "associated")
    {
     The frame is relayed to the mobile host.
     The MAP updates the time-of-last-activity using the current time.
    }
    else // The associating state is "unassociated"
    {
     If (The MAP's IP address is the mobile host's home agent's IP
       address)
     {
      If (The MAP knows the mobile host's care-of IP address via
        CARE-OF ADDRESS REGISTRATION messages)
      {
       // The mobile host is associating with an MAP on another subnet.
       The MAP encapsulates the frame into an IP packet with the
       MAP's IP address as source IP address and the care-of IP
       address as destination IP address.
       The MAP sends this IP packet to the default gateway on this
       subnet.
       The MAP updates the time-of-last-activity using the current time.
      }
      else // The MAP does not know where the mobile host is.
      {
       The frame is dropped.
      }
     }
     else // The MAP is not the mobile host's home agent
     {
      The frame is dropped.
     }
    }
   }
  }
 }
 else // The frame's destination MAC address is the MAP's MAC
   address.
 {
  If (The frame carries an IP packet that encapsulates an Ethernet frame)
  {
   // The frame is actually sent to a mobile host that is not on its home
   agent's subnet.
   The MAP decapsulates the Ethernet frame.
   The MAP looks up its state table using the Ethernet frame's
   destination MAC address as the index.
   If (There is no state record for this MAC address)
   {
    The Ethernet frame is dropped.
   }
   else // There is a state record for this MAC address
   {
    If (The routing state is "blocked")
    {
     The Ethernet frame is dropped.
    }
    else if (The routing state is "limited")
    {
     If (The associating state is "associated")
     {
```

```
    If (The carrying packet is not an IP configuration packet AND
      The carrying packet is not a DNS reply packet AND
      The carrying packet is not an HTTP packet from Web
      authentication server)
    {
      The Ethernet frame is dropped.
    }
    else // The Ethernet frame is entitled to pass the MAP.
    {
      The Ethernet frame is relayed to the mobile.
      The MAP updates the time-of-last-activity using the current time.
    }
  }
  else // The associating state is "unassociated"
  {
    The Ethernet frame is dropped.
  }
}
else // The routing state is "normal"
{
  If (The associating state is "associated")
  {
    The Ethernet frame is relayed to the mobile.
  }
  else // The associating state is "unassociated"
  {
    // The mobile host has left this MAP and is hopefully associating
    with another
    // MAP in this subnet. The mobile host must have sent a new
    CARE-OF
    // ADDRESS REGISTRATION message to its home agent, but the
    home agent
    // sent this encapsulated IP packet to this MAP before it receives
    that
    // CARE-OF ADDRESS REGISTRATION message.
    The MAP replaces the Ethernet frame's source MAC address with
    its own MAC address.
    The Ethernet frame is relayed to the WLAN.
  }
 }
}
}
else // The frame does not carry an IP packet that encapsulates an
Ethernet frame
{
  If (The carrying IP packet is a CARE-OF ADDRESS REGISTRA-
  TION message)
  {
    If (The MAP is the registered mobile's home agent)
    {
      The MAP updates the mobile's care-of IP address with this one in
      the state record.
      The MAP updates the time-of-last-activity using the current time.
      If (The care-of IP address is not on the same subnet as that of
      the MAP)
      {
        The MAP announces the arrival of the mobile host using IAPP.
      }
      The MAP sends back a positive CARE-OF ADDRESS
      ACKNOWLEDGE message using IP routing method.
    }
    else // The MAP is not the registered mobile's home agent)
    {
      The MAP sends back a negative CARE-OF ADDRESS
      ACKNOWLEDGE message using IP routing method.
    }
  }
  else if (The carrying IP packet is a HOME AGENT NOTIFICA-
  TION message)
  {
    The MAP saves the received state record for the mobile host into
    its state table.
    If (The care-of IP address is not on the same subnet as that of the
    MAP)
    {
      The MAP announces the arrival of the mobile host using IAPP.
    }
    The MAP sends back a positive HOME AGENT ACKNOWLDGE
    message using IP routing method.
  }
  else if (The carrying IP packet is a MOBILE STATE RESPONSE
  message)
  {
    The MAP saves the received state record for the mobile host into
    its state table.
  }
  else // The carrying IP packet is other type packet irrelevant to our
  interest.
  {
    The frame is passed to the upper layer of the network stack of the
    MAP.
  }
 }
}
End
```

When an outbound frame is sent from a mobile host arrives to an MAP, the MAP analyzes whether the mobile host is on its home subnet, and then whether to relay or re-route the frame accordingly. An illustrative process is described below using C syntax.

```
BEGIN
{
  The MAP looks up its state table using the frame's source MAC address
  as the index.
  If (There is no state record for this MAC address)
  {
    The frame is dropped.
  }
  else // There is a state record for this MAC address
  {
    The MAP updates the time-of-last-activity using the current time.
    If (The routing state is "blocked")
    {
      The frame is dropped.
    }
    else if (The routing state is "limited")
    {
      If (The carrying packet is not an IP configuration packet AND
        The carrying packet is not a DNS reply packet AND
        The carrying packet is not an HTTP packet to Web authentication
        server)
      {
        The frame is dropped.
      }
      else // The carrying packet is entitled to pass the MAP.
      {
        The frame is relayed to the wired network.
      }
    }
    else // The routing state is "normal"
    {
      If (The mobile's IP address is on the same subnet as that of the MAP)
      {
        // This means the mobile's home agent is on the same subnet.
        The frame is relayed to the WLAN at the link layer.
      }
      else // The mobile's home agent is on another subnet.
      {
        The MAP encapsulates the frame into an IP packet with the MAP's
        IP address as source IP address and the home agent's IP address as
        destination IP address.
        The MAP sends this IP packet to the default gateway on this subnet at
        the link layer.
      }
    }
  }
}
END
```

I claim:

1. A zero-configuration secure mobility networking method for a mobile host to connect to a network of wireless local area networks where there is no pre-configured account for the mobile host, comprising:
   receiving, by an authentication server, a message from a mobility access point, wherein the message is sent by the mobility access point using a media access control address of the mobile host as an index, wherein the mobile host is allowed to connect with a limited routing state to the mobility access point in a wireless local area network of the network of wireless local area networks;
   uploading, by the authentication server, an authentication page to the mobile host from the wireless local area network to enable a web page to be generated on the mobile host through a web interface, the web interface permitting a user to open an account at the authentication server while the mobile host is connected to the mobility access point of the wireless local area network in the limited routing state, and for subsequently enabling the mobile host to authenticate to the authentication server, wherein the uploading the authentication page comprises:
      receiving a hypertext transfer protocol request message to upload the authentication page, and sending a hypertext transfer protocol response message to the mobile host;
      receiving a second hypertext transfer protocol request message from the mobile host, and sending the authentication page to the mobile host; and
      receiving a third hypertext transfer protocol request message from the mobile host to signal the authentication server to verify the authentication credentials;
   receiving, by the authentication server, authentication credentials from the mobile host via the mobility access point in the wireless local area network;
   upon verifying the authentication credentials, changing, by the authentication server, the mobile host's routing state to normal at the mobility access point;
   uploading, by the authentication server, an applet to the mobile host; and
   upon detecting the mobile host associating with a new mobility access point, reauthenticating, by the authentication server, the mobile host via a challenge and response protocol by interacting with the applet that was previously uploaded to the mobile host and is running on the web interface on the mobile host.

2. The method recited in claim 1, further comprising:
accessing a database at the authentication server to determine the routing state for the mobile host.

3. The method recited in claim 2, further comprising:
creating a new state record in the database for the mobile host if a state record does not exist for a media access control address of the mobile host.

4. The method recited in claim 1, further comprising:
sending an authentication challenge message to a user datagram protocol port of the mobile host.

5. The method recited in claim 4, further comprising:
receiving an authentication response message from the mobile host; and
if the authentication response message is a valid response message to the authentication challenge message, changing the routing state from limited to normal, and updating a time-of-last activity for the mobile host using a current time.

6. The method recited in claim 4, further comprising:
setting the routing state to blocked, if the mobile host does not respond correctly to the authentication challenge message ; and
updating a time-of-last activity for the mobile host using a current time.

7. The method recited in claim 4, further comprising:
sending a care-of address registration message to a home agent of the mobile host, if the mobility access point is not the home agent of the mobile host.

8. The method recited in claim 4, further comprising:
sending an inter-access point protocol announcement message to the wireless local area network, if the mobility access point is on a same subnet as the mobile host.

9. The method recited in claim 3, further comprising:
encapsulating a frame destined for the mobile host into an Internet protocol packet; and
sending the frame to a care-of Internet protocol address of the mobile host.

10. The method recited in claim 3, further comprising:
forwarding a frame destined for the mobile host to the wireless local access network at a link layer, if a home agent of the mobile host is on a same subnet as the mobile host.

11. The method recited in claim 3, further comprising:
encapsulating a frame destined for the mobile host into an internet protocol packet with an internet protocol address of the mobility access point as a source internet protocol address and an internet protocol address of a home agent as a destination internet protocol address, if the home agent of the mobile host is on another subnet; and
sending the internet protocol packet to a default gateway on the another subnet at a link layer.

12. A zero-configuration secure mobility networking method for a mobile host to securely communicate with a network over wireless local area networks using a mobility access point comprising:
   employing, by an authentication server, a zero-configuration wireless local access network security method and a zero-configuration mobility method, the zero-configuration wireless local access network security method comprising:
      authenticating the mobile host using a data-link layer authentication method and a network layer authentication method, the data-link layer authentication method comprising:
         authenticating the wireless local access network host using 802.1x-based digital certificates, wherein the data-link layer authentication method provides a network-to-user authentication and generates session-specific encryption keys; and
      the network layer authentication method comprising:
         once the mobile host is authenticated to a wireless local access network, obtaining a full internet protocol connectivity and receiving a secure mobility support;
         delivering a client-side program by a web page for consequent authentications; and
   the zero-configuration mobility method comprising:
      fixing an internet protocol address to the mobile host as the mobile host moves from one access point to another in the wireless local access network;

encrypting communication between the mobile host and the wireless local access network; and when the mobile host moves to a new wireless local access network access point, authenticating the mobile host to the new wireless local access network access point, by using the client-side program that was previously delivered to the mobile host and is running on the mobile host, wherein the wireless local access network only allows the mobile host to obtain internet protocol networking configuration parameters and to communicate with a web-based authentication server before the mobile host passes the data-link layer authentication method that is responsible for user-to-network authentication.

13. The method according to claim 12, wherein the data-link layer authentication method is based on an extensible authentication protocol-transport layer security or extensible authentication protocol-tunneled transport layer security-password authentication protocol.

14. The method according to claim 12 wherein the data-link layer authentication method further comprises:
if an extensible authentication protocol-transport layer security is used, not enforcing a user-to-network authentication in an extensible authentication protocol-transport layer security authentication server wherein no account information needs to be pre-configured on mobile computers; and
if an extensible authentication protocol-tunneled transport layer security-password authentication protocol is used, admitting any username and password in the authentication server.

15. The method according to claim 12, wherein the client-side program is an applet.

* * * * *